(12) United States Patent
Modha et al.

(10) Patent No.: US 8,682,822 B2
(45) Date of Patent: Mar. 25, 2014

(54) ELECTRONIC LEARNING SYNAPSE WITH SPIKE-TIMING DEPENDENT PLASTICITY USING MEMORY-SWITCHING ELEMENTS

(75) Inventors: Dharmendra S. Modha, San Jose, CA (US); Rohit S. Shenoy, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/527,043

(22) Filed: Jun. 19, 2012

(65) Prior Publication Data

US 2012/0265719 A1    Oct. 18, 2012

Related U.S. Application Data

(63) Continuation of application No. 12/470,403, filed on May 21, 2009, now Pat. No. 8,250,010.

(51) Int. Cl.
*G06F 15/18* (2006.01)
*G06N 3/08* (2006.01)

(52) U.S. Cl.
USPC .......................................................... 706/25

(58) Field of Classification Search
USPC .............................. 706/25, 15, 62
See application file for complete search history.

(56) References Cited

U.S. PATENT DOCUMENTS

| | | | |
|---|---|---|---|
| 6,141,241 A | 10/2000 | Ovshinsky et al. | |
| 6,314,014 B1 | 11/2001 | Lowrey et al. | |
| 6,671,710 B2 | 12/2003 | Ovshinsky et al. | |
| 6,844,582 B2 | 1/2005 | Ueda et al. | |

(Continued)

FOREIGN PATENT DOCUMENTS

| | | |
|---|---|---|
| JP | 2006196594 A | 7/2006 |
| JP | 2007004514 A | 1/2007 |
| WO | 9308575 A1 | 4/1993 |
| WO | 0062301 A1 | 10/2000 |

OTHER PUBLICATIONS

Linares-Barranco et al, "Memristance can explain Spike-Time-Dependent-Plasticity in Neural Synapses", Nature Precedings : hdl:10101/npre.2009.3010.1 : Posted Mar. 31, 2009.*

(Continued)

*Primary Examiner* — Jeffrey A Gaffin
*Assistant Examiner* — Ilya Traktovenko
(74) *Attorney, Agent, or Firm* — Kenneth L. Sherman, Esq.; Michael Zarrabian, Esq.; Sherman & Zarrabian LLP

(57) ABSTRACT

A system, method and computer program product produce spike-dependent plasticity in an artificial synapse. A method includes: an electronic device generating a pre-synaptic pulse that occurs a predetermined period of time after receiving a pre-synaptic spike at a first input. The electronic device generating a post-synaptic pulse that starts at a baseline value and reaches a first voltage value a first period of time after receiving a post-synaptic spike at a second input, followed by a second voltage value a second period of time after the post synaptic spike, followed by a return to said baseline voltage a third period of time after the post-synaptic spike. The generated pre-synaptic pulse is applied to a pre-synaptic node of a synaptic device in series with a rectifying element that has a turn-on voltage based on a threshold. The generated post-synaptic pulse is applied to a post-synaptic node of said synaptic device.

18 Claims, 6 Drawing Sheets

(56) References Cited

U.S. PATENT DOCUMENTS

| | | | |
|---|---|---|---|
| 6,999,953 | B2 | 2/2006 | Ovhsinsky |
| 7,085,155 | B2 | 8/2006 | Ovshinsky et al. |
| 7,092,923 | B2 | 8/2006 | Arima |
| 7,149,103 | B2 | 12/2006 | Ahn |
| 7,186,998 | B2 | 3/2007 | Ovshinsky et al. |
| 7,401,058 | B2 | 7/2008 | Michel et al. |
| 7,412,428 | B2 | 8/2008 | Nugent |
| 7,426,501 | B2 | 9/2008 | Nugent |
| 7,967,994 | B2 | 6/2011 | Lowrey et al. |
| 8,138,028 | B2 | 3/2012 | Lung et al. |
| 2009/0029031 | A1 | 1/2009 | Lowrey |
| 2010/0299297 | A1 | 11/2010 | Breitwisch |

OTHER PUBLICATIONS

Breitwisch, "Phas Change Memory", Interconnect Technology Conference, 2008. IITC 2008. International, Jun. 1-4, 2008, ISBN: 978-1-4244-1911-1, pp. 219-221.*

Erokhin et al, "Polymeric Elements for Adaptive Networks", ISSN 1063-7745, Crystallography Reports, 2007, vol. 52, No. 1, pp. 159-166, Pleiades Publishing, Inc., 2007.*

Lam, C., "Phase-Change Memory", 2007, Proceedings of the 65th Annual Device Research Conference, Jun. 2007, pp. 223-226, IEEE, United States.

Snider, G.S., "Spike-Timing-Dependent Learning in Memristive Nanodevices", Proceedings of the 2008 IEEE International Symposium on Nanoscale Architectures (NANOARCH 2008), 2008, pp. 85-92, IEEE, United States.

Gupta, S. et al., "W-2W Current Steering DAC for Programming Phase Change Memory", Proceedings of the 2009 IEEE Workshop on Microelectronics and Electron Devices (WMED 2009), 2009, 4 pages, IEEE, United States.

Breitwisch, M.J., "Phase Change Memory", Proceedings of the 2008 International Interconnect Technology Conference (IITC 2008), Jun. 2008, pp. 219-221, IEEE, United States.

Linares-Barranco, B. et al., "Memristance Can Explain Spike-Time Dependent-Plasticity in Neural Synapses", Nature Precedings, Mar. 31, 2009, 4 pages, Nature Publishing Group, United States.

Notification of Transmittal of the International Search Authority, International Search Report and Written Opinion dated Jul. 27, 2010 for International Application No. PCT/EP2010/054719 from European Patent Office, filed Apr. 9, 2010, pp. 1-16, Rijswijk, The Netherlands.

Ovshinsky, S.R., "The Ovonic Cognitive Computer—A New Paradigm," Proceedings of the Third European Phase Change and Ovonics Symposium (E\PCOS '04), 2004, 8 pages, E\PCOS, United States.

Rusu, M.I. et al., "New Phase-Change Materials to Achieve Cognitive Computing-Overview and Future Trends," Proceedings of the 9th International Conference on Transparent Optical Networks (ICTON '07), Jul. 2007, pp. 287-289, IEEE, United States.

Abbott, L.F. et al., "Synaptic Computation," Nature, Oct. 14, 2004, pp. 796-803, vol. 431, Nature Publishing Group, United States.

Ananthanarayanan, R. et al., "Anatomy of a Cortical Simulator," Proceedings of the 2007 ACM/IEEE Conference on Supercomputing (SC '07), 2007, 12 pages, ACM, United States.

Snider, G.S., "Self-Organized Computation with Unreliable, Memristive Nanodevices", Nanotechnology, 2007, 13 pages, vol. 18, No. 36, IOP Publishing Ltd., United Kingdom.

Abbott, L.F. et al., "Synaptic Depression and Cortical Gain Control," Science, Jan. 10, 1997, pp. 220-224, vol. 275, No. 5297, American Association for the Advancement of Science, United States.

Song, S. et al., "Competitive Hebbian Learning Through Spike-Timing-Dependent Synaptic Plasticity," Nature Neuroscience, Sep. 2000, pp. 919-926, vol. 3, No. 9, Nature Publishing Group, United States.

Chen, K.N. et al., "Programmable via Using Indirectly Heated Phase-Change Switch for Reconfigurable Logic Applications," IEEE Electron Device Letters, Jan. 2008, pp. 131-133, vol. 29, No. 1, IEEE, United States.

Rajendran, B. et al., "Dynamic Resistance—A Metric for Variability Characterization of Phase-Change Memory," IEEE Electron Device Letters, Feb. 2009, pp. 126-129, vol. 30, No. 2, IEEE, United States.

Nirschl, T. et al., "Write Strategies for 2 and 4-bit Multi-Level Phase-Change Memory," Proceedings of the 2007 IEEE International Electron Devices Meeting (IEDM '07), 2007, pp. 461-464, IEEE, United States.

Notification of Transmittal of the International Search Authority, International Search Report and Written Opinion dated Jul. 27, 2010 for International Application No. PCT/EP2010/054670 from European Patent Office, filed Apr. 8, 2010, pp. 1-15, Rijswijk, Netherlands.

Borghetti, J. et al., "A Hybrid Nanomemristor/Transistor Logic Circuit Capable of Self-Programming," Proceedings of the National Academy of Sciences (PNAS), Feb. 10, 2009, pp. 1699-1703, vol. 106, No. 6, National Academy of Sciences, United States.

U.S. Non-Final Office Action for U.S. Appl. No. 12/470,403 mailed Dec. 20, 2011.

U.S. Notice of Allowance for U.S. Appl. No. 12/470,403 mailed Apr. 13, 2012.

U.S. Non-Final Office Action for U.S. Appl. No. 12/470,451 mailed Jan. 5, 2012.

U.S. Final Office Action for U.S. Appl. No. 12/470,451 mailed Apr. 24, 2012.

U.S. Notice of Allowance for U.S. Appl. No. 12/470,451 mailed Jan. 14, 2013.

Erokhin, V.V. et al., "Polymeric Elements for Adaptive Networks," Crystallography Reports, 2007, pp. 159-166, vol. 52, No. 1, Pleiades Publishing, Inc., Russia.

U.S. Non-Final Office Action for U.S. Appl. No. 12/470,451 mailed Sep. 24, 2012.

\* cited by examiner

ELECTRONIC LEARNING SYNAPSE WITH SPIKE-TIMING DEPENDENT PLASTICITY USING MEMORY-SWITCHING ELEMENTS

CROSS-REFERENCE TO RELATED APPLICATIONS

This patent application is a continuation patent application of U.S. patent application Ser. No. 12/470,403, filed on May 21, 2009, the disclosure of which is incorporated herein its entirety by reference.

GOVERNMENT RIGHTS

This invention was made with United States Government support under Agreement No. HR0011-09-C-0002 awarded by Defense Advanced Research Projects Agency (DARPA). The government has certain rights in the invention.

BACKGROUND

The present invention relates to artificial neural networks, and more specifically, to electronic learning synapses with spike-dependent plasticity.

The point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre- and post-synaptic neurons as per spike-timing dependent plasticity (STDP). The STDP rule increases the conductance of a synapse if its post-synaptic neuron fires after its pre-synaptic neuron fires, and decreases the conductance of a synapse if the order of two firings is reversed. Further, the change depends on the precise delay between the two events: the more the delay, the less the magnitude of change.

Artificial neural networks are computational systems that permit computers to essentially function in a manner analogous to that of biological brains. Artificial neural networks do not utilize the traditional digital model of manipulating 0s and 1s. Instead, they create connections between processing elements, which are equivalent to neurons of a human brain. Artificial neural networks may be based on various electronic circuits that are modeled on neurons.

BRIEF SUMMARY

According to one embodiment of the present invention, a method comprises: receiving a pre-synaptic spike in an electronic component; receiving a post-synaptic spike in the electronic component; in response to the pre-synaptic spike, generating a pre-synaptic pulse that occurs a predetermined period of time after the received pre-synaptic spike; in response to the post-synaptic spike, generating a post-synaptic pulse that starts at a baseline value and reaches a first voltage value a first period of time after the post-synaptic spike, followed by a second voltage value a second period of time after the post synaptic spike, followed by a return to the baseline voltage a third period of time after the post-synaptic spike; applying the generated pre-synaptic pulse to a pre-synaptic node of a synaptic device that includes a uni-polar, two-terminal bi-stable device in series with a rectifying element; and applying the generated post-synaptic pulse to a post-synaptic node of the synaptic device, wherein the synaptic device changes from a first conductive state to a second conductive state based on the value of input voltage applied to its pre and post-synaptic nodes, wherein the resultant state of the conductance of the synaptic device after the pre- and post-synaptic pulses are applied thereto depends on the relative timing of the received pre-synaptic spike with respect to the post synaptic spike.

According to another embodiment of the present invention, a method comprises: receiving a pre-synaptic spike in an electronic component; receiving a post-synaptic spike in the electronic component; in response to the pre-synaptic spike, generating a pre-synaptic pulse that starts at a baseline value and reaches a first voltage value a first period of time after the pre-synaptic spike, followed by a second voltage value a second period of time after the pre-synaptic spike, followed by a return to the baseline voltage a third period of time after the pre-synaptic spike; in response to the post-synaptic spike, generating a post-synaptic pulse that occurs a predetermined period of time after the received post-synaptic spike; applying the generated pre-synaptic pulse to a pre-synaptic node of a synaptic device that includes a uni-polar, two-terminal bi-stable device in series with a rectifying element; and applying the generated post-synaptic pulse to a post-synaptic node of the synaptic device, wherein the synaptic device changes from a first conductive state to a second conductive state based on the value of input voltage applied to its pre- and post-synaptic nodes, wherein the resultant state of the conductance of the synaptic device after the pre- and post-synaptic pulses are applied thereto depends on the relative timing of the received pre-synaptic spike with respect to the post-synaptic spike.

According to a further embodiment of the present invention, an apparatus comprises: a uni-polar, two-terminal bi-stable device connected to a pre-synaptic terminal; a rectifying element having first and second ends, the rectifying element connected at the first end to the uni-polar, two-terminal bi-stable device and connected at the second end to a post-synaptic terminal; and at least one pulse shaper element generating a series of voltage pulses to the pre-synaptic and post-synaptic terminals, wherein in response to a received pre-synaptic spike, the element generates a pulse at the pre-synaptic terminal that occurs a predetermined period of time after the received pre-synaptic spike, and wherein in response to a post-synaptic spike, the element generates a pulse at the post-synaptic terminal that starts at a baseline value and reaches a first voltage value a first period of time after the post-synaptic spike, followed by a second voltage value a second period of time after the post synaptic spike, followed by a return to the baseline voltage a third period of time after the post-synaptic spike.

According to a further embodiment of the present invention, an apparatus comprises: a plurality of uni-polar, two-terminal bi-stable devices each connected to a pre-synaptic terminal; a plurality of rectifying elements having respective first and second ends, each connected at the first end to one of the uni-polar, two-terminal bi-stable devices and connected at the second end to a post-synaptic terminal; and at least one pulse shaper element generating a series of voltage pulses to the pre-synaptic and post-synaptic terminals, wherein in response to a received pre-synaptic spike, the pulse shaper element generates a pulse at the pre-synaptic terminal that occurs a predetermined period of time after the received pre-synaptic spike, and wherein in response to a post-synaptic spike, the element generates a pulse at the post-synaptic terminal that starts at a baseline value and reaches a first voltage value a first period of time after the post-synaptic spike, followed by a second voltage value a second period of time after the post synaptic spike, followed by a return to the baseline voltage a third period of time after the post-synaptic spike.

According to another embodiment of the present invention, a computer program product for providing pre-synaptic and post-synaptic pulses to a synaptic device comprises: a computer usable medium having computer usable program code embodied therewith, the computer usable program code comprising: computer usable program code configured to: in response to a representation of a pre-synaptic spike, generate an instruction to a uni-polar, two-terminal, bi-stable device to generate a pre-synaptic pulse that occurs a predetermined period of time after the received pre-synaptic spike; and in response to a representation of a post-synaptic spike, generate an instruction to a device to generate a post-synaptic pulse that starts at a baseline value and reaches a first voltage value a first period of time after the post-synaptic spike, followed by a second voltage value a second period of time after the post synaptic spike, followed by a return to the baseline voltage a third period of time after the post-synaptic spike.

DETAILED DESCRIPTION

Figure 1:
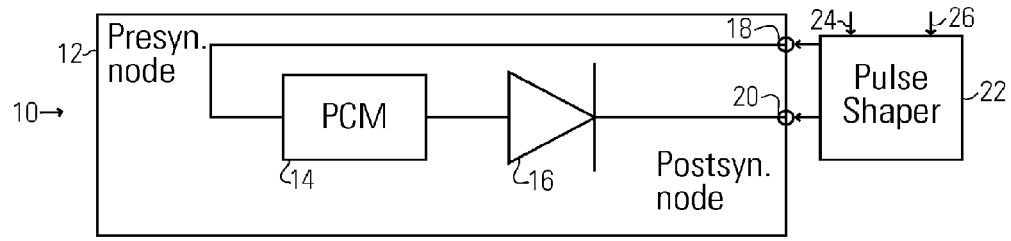
FIG. 1 shows a block diagram of an artificial synapse system in accordance with an embodiment of the invention.

Embodiments of the invention provide a system, method and computer readable medium for electronic learning synapses with spike-dependent plasticity using memory switching elements. The term "neuron" was coined by Heinrich Wilhelm Gottfried von Waldeyer-Hartz in 1891 to capture the discrete information processing units of the brain. The junctions between two neurons were termed "synapses" by Sir Charles Sherrington in 1897. Information flows only along one direction through a synapse, thus we talk about a "pre-synaptic" and a "post-synaptic" neuron. Neurons, when activated by sufficient input received via synapses, emit "spikes" that are delivered to those synapses that the neuron is pre-synaptic to. Neurons can be either "excitatory" or "inhibitory."

A brain can be thought of as a directed graph where nodes are neurons and edges are synapses. The following table shows the rough number of neurons and synapses in a mouse, rat, and human. Each neuron in mammalian cortex makes roughly 8,000 synapses with other neurons.

|  | Mouse | Rat | Human |
|---|---|---|---|
| Neurons | $16 \times 10^6$ | $56 \times 10^6$ | $22 \times 10^9$ |
| Synapses | $128 \times 10^9$ | $448 \times 10^9$ | $220 \times 10^{12}$ |

The computation, communication, and memory resources of the brain all scale with the number of synapses and not with the number of neurons. Even power and space requirements scale as number of synapses.

Some of the physical characteristics of the synapses are as follows. Synaptic density is roughly $7.2 \times 10^8$ per $mm^3$ which roughly corresponds to placing synapses at a three dimensional grid with 1 μm spacing in every direction. This figure seems to be a constant of nature across all mammalian cortices.

Synaptic weight is the influence that a pre-synaptic firing will have on post-synaptic neuron. Synaptic weights are plastic or adaptive, and change through time. Synaptic weight exhibits two forms of plasticity: (a) Long-term and (b) Short-term. Long-term changes in the transmission properties of synapses provide a physiological substrate for learning and memory, whereas short-term changes support a variety of computations. The mechanism of short-term plasticity is a form of gain control, and is not treated in this disclosure.

The mechanism of long-term weight adaptation is known as spike-timing dependent plasticity (STDP). Causality is a key element of STDP. Correlated activity can occur purely by chance, rather than reflecting a causal relationship that should be learned. Inputs that consistently are best at predicting a post-synaptic response should become the strongest inputs to the neuron. Thus in STDP, synapses are only strengthened if their pre-synaptic action potential precedes, and thus could have contributed to, the firing of the post synaptic neuron. Accidental, non-causal coincidences will weaken synapses.

We describe one of the prevalent phenomenological descriptions of STDP: (a) if pre-synaptic neuron fires t milliseconds before the post-synaptic neuron fires then the synaptic weight is increased (strengthened, potentiated) by $A_+\exp(-t/\tau)$ where $A_+$ and $\tau$ are constants; (b) if pre-synaptic neuron fires t milliseconds after the post-synaptic neuron fires then the synaptic weight is decreased (weakened, depressed) by $A_-\exp(-t/\lambda)$ where $A_-$ and $\lambda$ are constants.

If the synapse is assumed to be binary, then, at the broadest level, STDP can be summarized as follows: if the post-synaptic neuron fires within a short time of the pre-synaptic neuron, then synapse is turned fully ON, whereas if the pre-synaptic neuron fires within a short time of the post-synaptic neuron, then synapse is turned fully OFF. The STDP rule permits the brain to extract causality and correlations from a spatio-temporally varying environment.

A key characteristic of classical von Neumann computing is the separation of computation and memory. Specifically, if a memory location is to be modified, it is brought into a separate computing unit, modified, and then restored. This three-step process creates the classical von Neumann bottleneck that has plagued modern computer systems. In contrast to von Neumann computing, synapses are memory elements that are modified in-place, that is, memory and computation are distributed in the brain.

In general, embodiments of the present invention include a device that exhibits synapse-like function. In particular, embodiments make use of a memory-switching element whose program and erase operations can be accomplished with the same voltage polarity. An example of such a device is a phase-change memory (PCM), which in this case is a uni-polar, two-terminal, bi-stable device. A phase-change memory device can be switched as follows: a lower voltage (current) pulse to program or set (that is, go from low conductance amorphous state to high conductance crystalline state) and a higher voltage (current) pulse to erase or reset (that is, go from high conductance to low conductance state). Embodiments of the invention make use of novel bipolar pre and post-synaptic pulses that can capture the essence of STDP in such materials. Specifically, by using the PCM device in series with a diode, these novel pre and post-synaptic pulses can be shaped to program the device if the post-synaptic pulse follows the pre-synaptic pulse within 100 ms, or erase the device if the pre-synaptic pulse follows the post-synaptic pulse within 100 ms. While the disclosed embodiments may not permit multiple conductance states, they can reward causality and punish anti-causality in a STDP-like way. Embodiments of the present invention disclose a synapse-like device, which breaks the mold of traditional computing by creating a form of active memory.

FIG. 1 shows a schematic of the artificial synapse system 10 which consists of an artificial binary synapse 12, and a two terminal PCM device 14 in series with a diode 16. The artificial binary synapse 12 includes a pre-synaptic node 18 and a post-synaptic node 20. A pulse shaper unit 22 has a pre-synaptic output 24 connected to the pre-synaptic node 18 and a post-synaptic output connected to the post-synaptic node 20. The pulse shaper unit 22 includes a pre-synaptic spike input 24 and a post-synaptic spike input 26. The pulse shaper unit 22 receives pre-synaptic and post-synaptic spikes at its two inputs 24, 26 respectively, and transforms them into pre-synaptic and post-synaptic input pulses as described below and shown in FIGS. 2-6. In some embodiments, separate electronic devices or components may be employed in the place of the single pulse shaper unit 22: one receiving the pre-synaptic spike and one receiving the post-synaptic spike.

The PCM device 14 is assumed to have a threshold voltage, $V_{Th}$=0.9V. If the PCM device 14 is in the low conductance amorphous (RESET) state, voltages less than $V_{Th}$ applied across it will not cause current to flow, but voltages greater than $V_{Th}$ will result in threshold switching behavior and current will flow through the device. Note that if the PCM device is in the high conductance crystalline (SET) state, then the threshold voltage criterion does not apply.

In addition, we assume that a voltage pulse of magnitude approximately 1.1V will switch the PCM device 14 into the high conductance crystalline (SET) state regardless of the original state. Note that this voltage refers to the voltage across the PCM device. Finally, we assume that a voltage pulse of magnitude approximately 1.4V will switch the PCM device 14 into the low conductance amorphous (RESET) state regardless of the original state.

Figure 2:
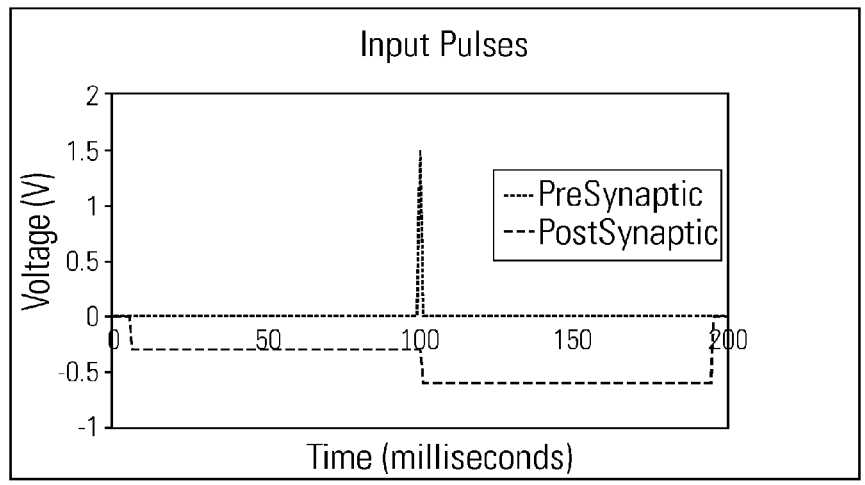
FIG. 2 shows exemplary input pulses used with the artificial synapse system in accordance with an embodiment of the invention.

The diode 16 is assumed to have the following property. Voltages<0.7V applied between the anode and cathode will not result in any current being passed. Voltages>0.7V will result in the diode turning on with low resistance. A negligible amount of voltage is assumed to drop across the diode in its turned-on state. Thus the diode serves as a voltage level shifter for all voltages>0.7 V. The pulse shaper unit 22 transforms the raw pre-synaptic and post-synaptic spikes received at its inputs 24, 26 into specially shaped pulses that are shown in FIG. 2. In some embodiments, the pulse shaper unit 22 could be shared among many synapses similar to synapse 12 in order to reduce overall area consumption.

In an embodiment, the pulse shaper unit 22 generates the pre-synaptic pulse shown in FIG. 2, which is essentially a 1.5V spike of very narrow width (e.g., 10-100 nsec) and is triggered 100 ms after the arrival of the original pre-synaptic spike received at its input 24. The pulse shaper unit 22 also generates a post-synaptic pulse which has two parts: a −0.3V level voltage triggered a few ms (e.g., 5 ms) after the arrival of the original post-synaptic spike at post-synaptic input 26 followed by a −0.6V level voltage 100 ms after the arrival of the original post-synaptic spike. This −0.6V level voltage relaxes back to 0V in a time slightly shorter than 100 ms (95 ms in this example). When there are no pre-synaptic and post-synaptic spikes, at inputs 24, 26, zero (0) V is applied to both the pre-synaptic and post-synaptic nodes 18, 20 of the artificial binary synapse 12 shown in FIG. 1.

Figure 3:
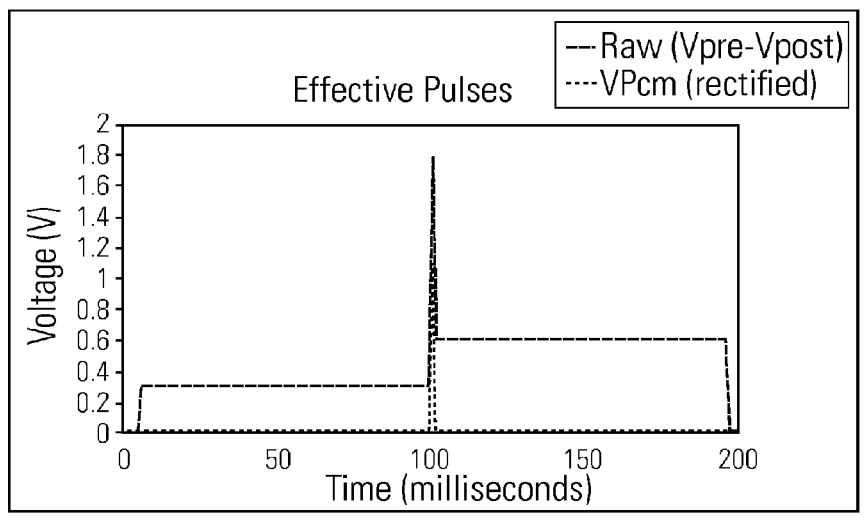
FIG. 3 shows exemplary effective pulses resulting from the input pulses shown in FIG. 2 in accordance with an embodiment of the invention.

The effective voltages that develop across the artificial binary synapse 12 and the PCM device 14 are shown in FIG. 3. Here the main purpose of the diode 16 is apparent. By rectifying the current that could potentially flow through the synapse, the energy dissipated per synaptic operation is greatly reduced since current flows for 10-100 ns, instead of .about.200 ms.

Figure 4:
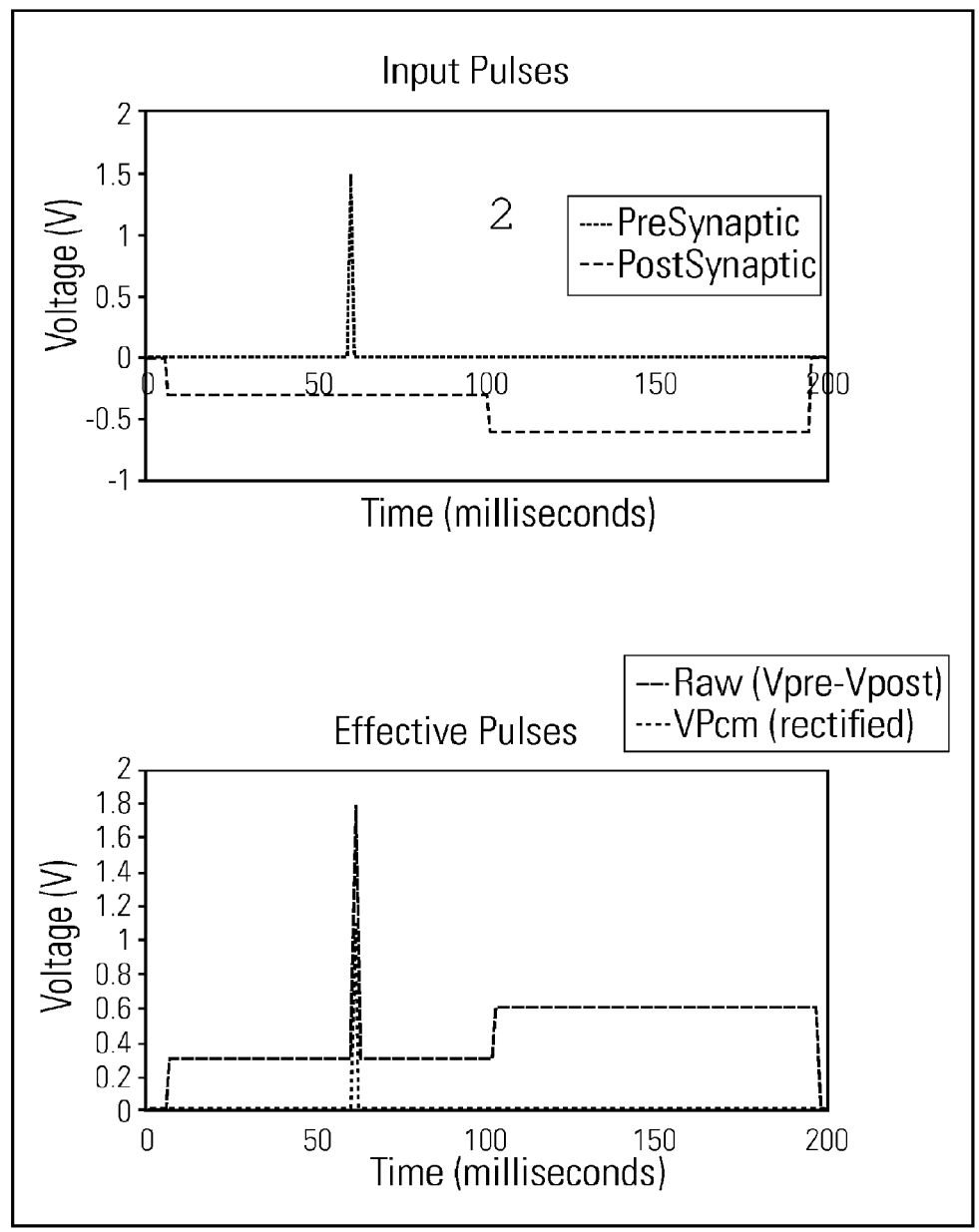
FIG. 4 shows exemplary input and effective pulses in accordance with an embodiment of the invention.

We now consider 3 cases:

Case 1: Pre-synaptic pulse arrives just before post-synaptic pulse (within desired time window, 95 ms in this example). As shown in FIG. 4, this results in an effective 1.1V pulse across the PCM device 14, which SETs the PCM device 14 (increases conductance).

Figure 5:
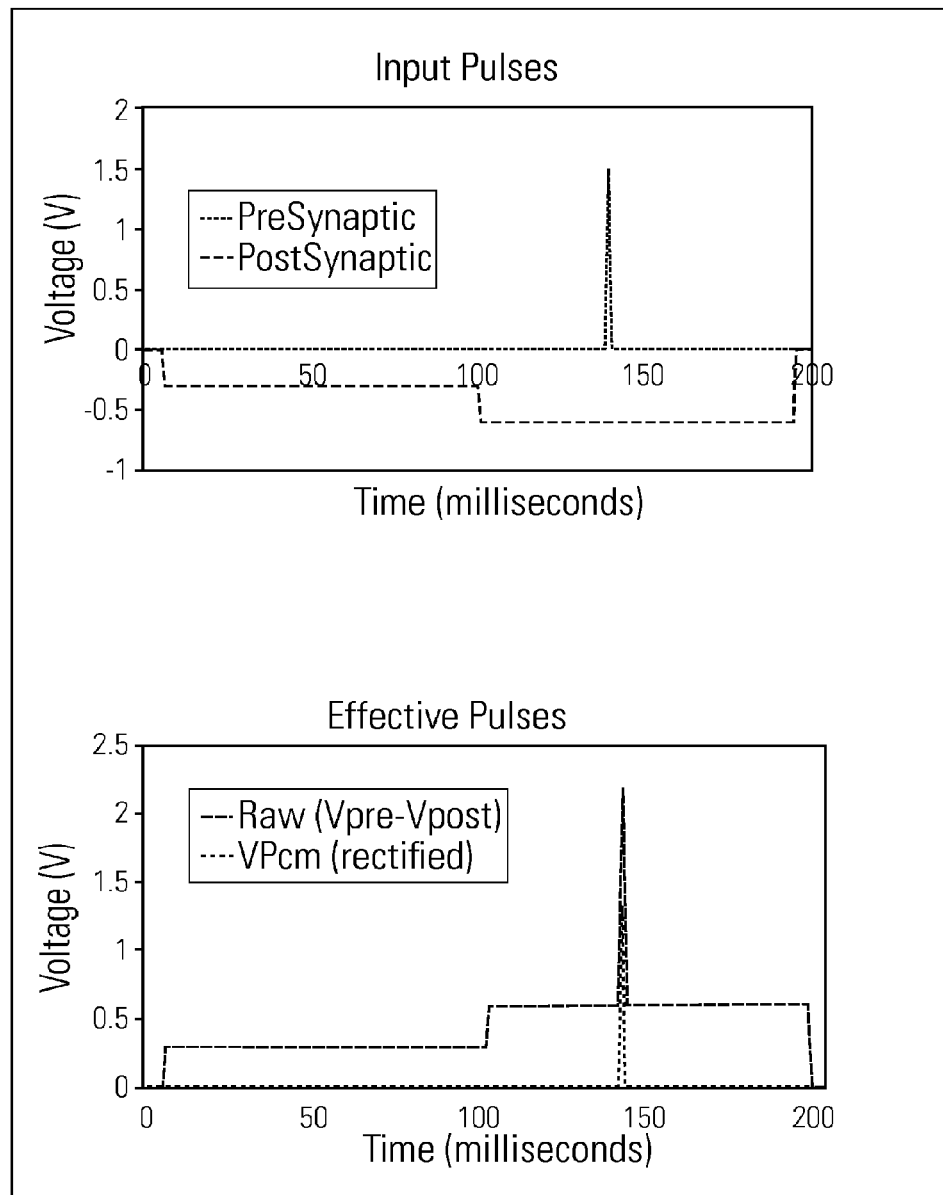
FIG. 5 shows exemplary input and effective pulses in accordance with an embodiment of the invention.

Case 2: Pre-synaptic pulse arrives just after post-synaptic pulse (within desired time window, 95 ms in this example). As shown in FIG. 5, the resulting 1.4V pulse across the PCM device 14, which RESETs the PCM device 14 (decreases conductance).

Figure 6:
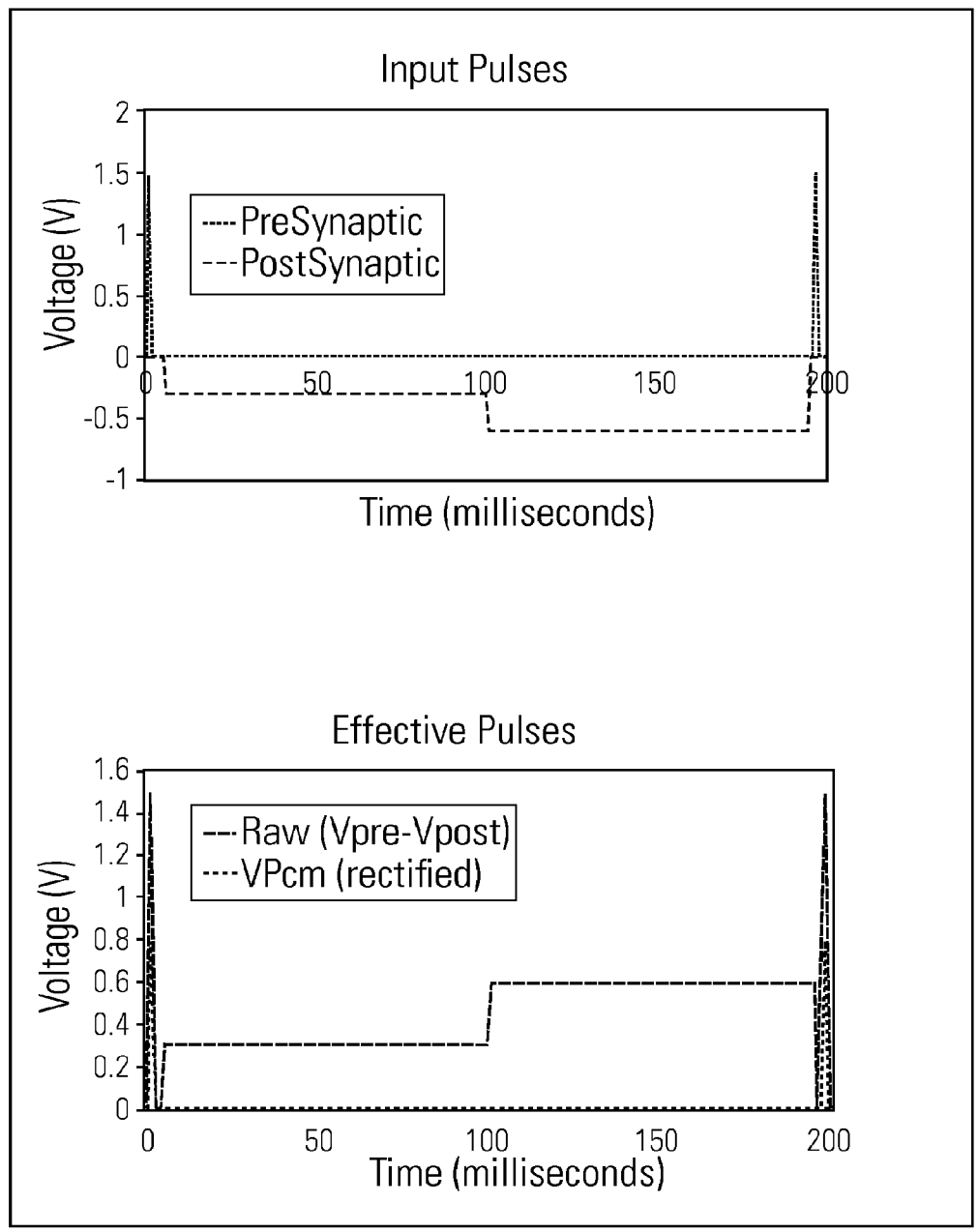
FIG. 6 shows exemplary input and effective pulses in accordance with an embodiment of the invention.

Case 3: Pre-synaptic pulse arrives much before/after post-synaptic pulse (outside of desired time window, 95 ms in this example). As shown in FIG. 6, this results in a 0.8V pulse across the PCM device 14, which does not change the state of the PCM device 14. If originally RESET, 0.8V being less than $V_{Th}$ (0.9V), the PCM device 14 remains RESET. If originally SET, the pulse is passed through without RESETing the PCM device 14 (that would have required 1.4V), hence, the PCM device 14 remains SET. It will be appreciated that the precise values of actual voltages and time periods are for illustration only, and many other values may be used with different embodiments.

Figure 7:
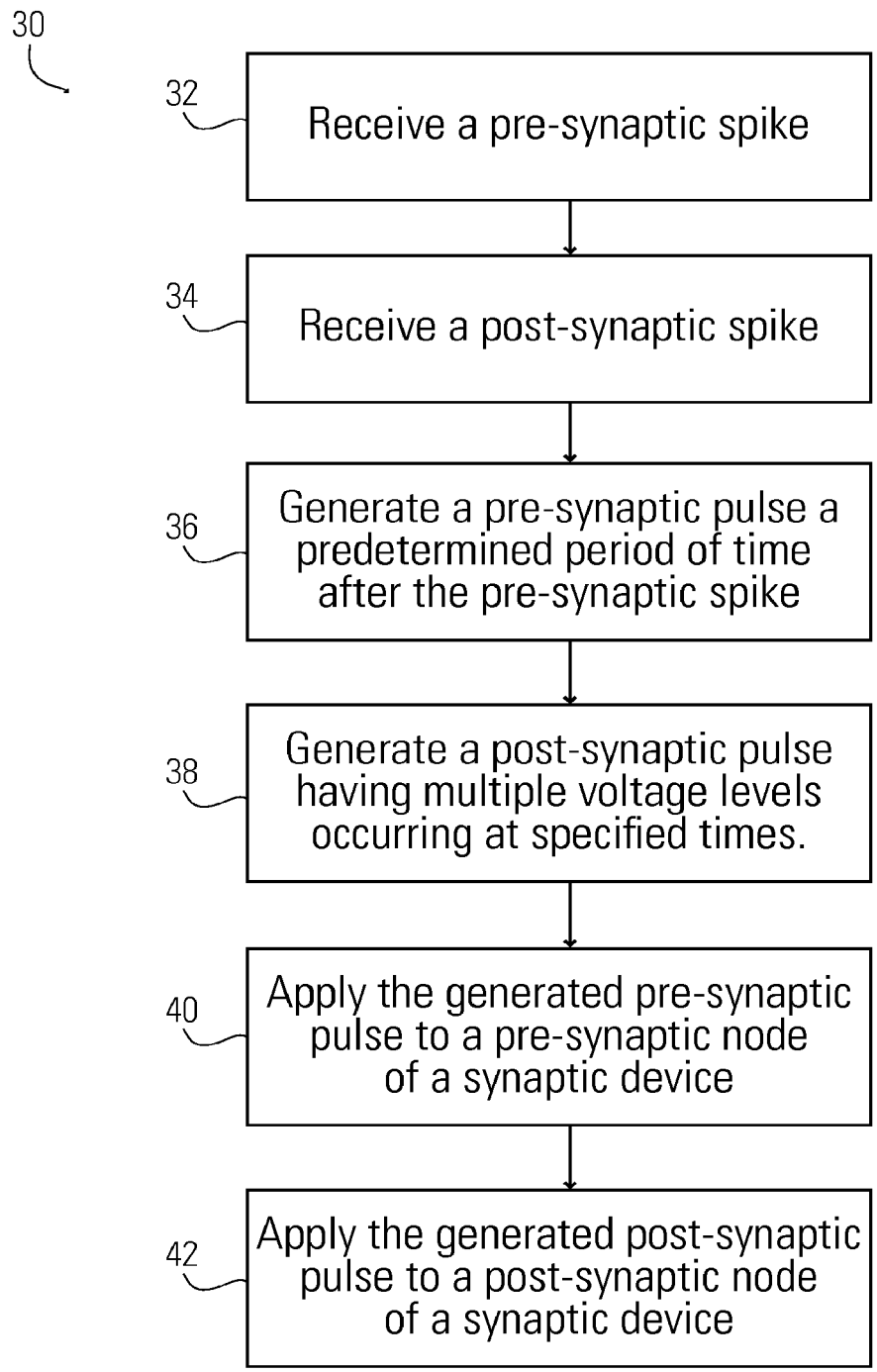
FIG. 7 shows a flowchart of a process for producing spike-timing dependent plasticity in an artificial synapse in accordance with an embodiment of the invention.

FIG. 7 is a flowchart of a process 30 for causing an artificial synapse, such as the artificial synapse 12, to exhibit STDP-like behavior in accordance with an embodiment of the invention. At block 32, a pre-synaptic spike is received at input 24. At block 34 a post-synaptic spike is received at input 26. A pre-synaptic pulse is generated by the pulse shaper unit 22 a predetermined period of time after the pre-synaptic spike, in block 36. A post-synaptic pulse is generated by the pulse shaper unit 22 having multiple voltage levels at specified times, in block 38. In particular, this may comprise the post-synaptic pulse shown in FIG. 2. In block 40, the generated pre-synaptic pulse is applied to a pre-synaptic node of a synaptic device, such as device 12. In block 42, the generated post-synaptic pulse is applied to a post-synaptic node of a synaptic device, such as device 12. In one embodiment of the invention, the full width half maximum (FWHM) of the one of the voltage pulses is shorter in duration than the FWHM of the other of the voltage pulses by at least a factor of 1000.

In another embodiment of the invention, the shapes of the pre-synaptic and post-synaptic pulses may be switched and the resulting pre-synaptic pulse may be reflected around the y-axis. In this case, in response to the pre-synaptic spike, a pre-synaptic pulse is generated that starts at a baseline level and reaches a first voltage level a first period of time after the pre-synaptic spike, followed by a second voltage level a second period of time after the pre synaptic spike, followed by a return to the baseline voltage a third period of time after the pre-synaptic spike. Also, in response to the post-synaptic spike, a post-synaptic pulse is generated that occurs a predetermined period of time after the received post-synaptic spike. In other embodiments, devices which are not uni-polar may be used; however, the pulses may need to be modified. In other embodiments, devices other than two-terminal bi-stable PCM devices may be used. Also, devices other than PCM devices may be used, which have the property that their resistance can be changed as a function of the voltage applied across it, or as a function of the current running through it.

The present invention may be used in a variety of architectures for various purposes, such as to form spatio-temporal associations between a neural network and environmental events. One such example may be to embed the present invention in a cross bar array that forms a set of synapses connected to a set of neurons in an artificial neural network. In such an arrangement, the artificial synapse 10 in FIG. 1 may be connected at the junction of the vertical and horizontal bars of the cross-bar array. The vertical bars may be pre-synaptic wires connected to the pre-synaptic input 24 and the horizontal bars may be post-synaptic wires connected to the post-synaptic input 26 shown in FIG. 1.

As can be seen from the above disclosure, embodiments of the invention provide an electronic learning synapse with STDP plasticity using memory-switching elements. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention, or components thereof, may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More examples of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, and/or RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
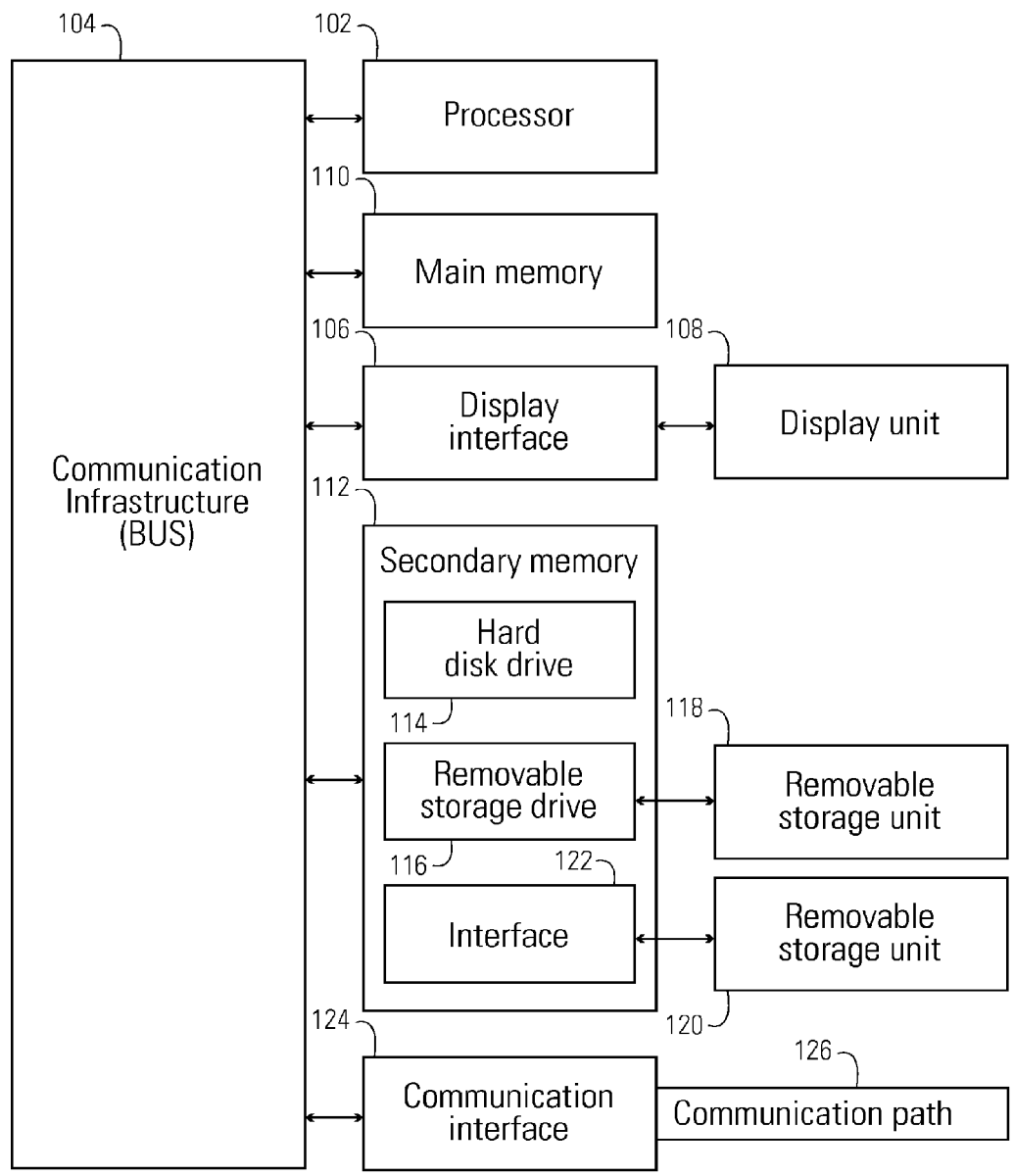
FIG. 8 shows a high level block diagram of an information processing system useful for implementing one embodiment of the present invention.

FIG. 8 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include a removable storage unit 120 and an interface 122. Other examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

an electronic device generating a pre-synaptic pulse that starts at a baseline value and reaches a first voltage value a first period of time after receiving a pre-synaptic spike at a first input, followed by a second voltage value a second period of time after said pre-synaptic spike, followed by a return to said baseline voltage a third period of time after said pre-synaptic spike;

the electronic device generating a post-synaptic pulse that occurs a predetermined period of time after receiving a post-synaptic spike at a second input;

applying said generated pre-synaptic pulse to a pre-synaptic node of a synaptic device in series with a rectifying element comprising a turn-on voltage based on a threshold; and applying said generated post-synaptic pulse to a post-synaptic node of said synaptic device;

wherein said synaptic device comprises a phase change memory (PCM) that has a set voltage, a reset voltage and a threshold voltage; and wherein said pre-synaptic pulse has a magnitude greater than said turn-on voltage but less than the sum of said turn-on voltage and said threshold voltage.

2. The method according to claim 1, wherein if said pre-synaptic spike precedes said post synaptic spike within a predetermined window of time, the resultant state of conductance of said synaptic device is a high conductance state.

3. The method according to claim 1, wherein if said pre-synaptic spike follows said post synaptic spike within a predetermined window of time, the resultant state of conductance of said synaptic device is a low conductance state.

4. The method according to claim 1, wherein said synaptic device includes a uni-polar, two-terminal bi-stable device.

5. The method according to claim 1,
wherein said synaptic device changes from a first conductive state to a second conductive state based on the value of input voltage applied to its pre and post-synaptic nodes, and
wherein the resultant state of the conductance of said synaptic device after said pre- and post-synaptic pulses are applied thereto depends on the relative timing of said received pre-synaptic spike with respect to said post synaptic spike.

6. A method comprising:
in response to an electronic device receiving a pre-synaptic spike at a first input, generating a pre-synaptic pulse;
in response to the electronic device receiving a post-synaptic spike at a second input, generating a post-synaptic pulse;
applying said generated pre-synaptic pulse to a pre-synaptic node of a synaptic device in series with a rectifying element comprising a turn-on voltage based on a threshold; and
applying said generated post-synaptic pulse to a post-synaptic node of said synaptic device;
wherein the synaptic device comprises a uni-polar, two-terminal bi-stable device including a phase change memory (PCM) that has a set voltage, a reset voltage and a threshold voltage; and
wherein said pre-synaptic pulse has a magnitude greater than said turn-on voltage but less than the sum of said turn-on voltage and said threshold voltage.

7. The method according to claim 6, wherein if said pre-synaptic spike precedes said post synaptic spike within a predetermined window of time, the resultant state of conductance of said synaptic device is a low conductance state.

8. The method according to claim 6, wherein if said pre-synaptic spike follows said post synaptic spike within a predetermined window of time, the resultant state of conductance of said synaptic device is a high conductance state.

9. The method according to claim 6,
wherein said synaptic device changes from a first conductive state to a second conductive state based on the value of input voltage applied to its pre and post-synaptic nodes, and
wherein the resultant state of the conductance of said synaptic device after said pre- and post-synaptic pulses are applied thereto depends on the relative timing of said received pre-synaptic spike with respect to said post synaptic spike.

10. An apparatus comprising:
a two-terminal device coupled to a pre-synaptic terminal;
a rectifying element having first and second ends, the rectifying element coupled at the first end to said two-terminal device and coupled at the second end to a post-synaptic terminal, wherein the rectifying element comprising a turn-on voltage based on a threshold; and
at least one pulse shaper element generating a series of voltage pulses to said pre-synaptic and post-synaptic terminals;
wherein in response to a received pre-synaptic spike, said element generates a pulse at said pre-synaptic terminal that occurs a predetermined period of time after said received pre-synaptic spike;
wherein said two-terminal device comprises a phase change memory (PCM) that has a set voltage, a reset voltage and a threshold voltage; and
wherein said pre-synaptic pulse has a magnitude greater than said turn-on voltage but less than the sum of said turn-on voltage and said threshold voltage.

11. The apparatus according to claim 10, wherein said two-terminal device changes from a first conductive state to a second conductive state based on the voltage of said generated pulse applied to its pre-synaptic and post-synaptic nodes, and also based on whether said pre-synaptic spike precedes or follows said post-synaptic spike within a predetermined window of time.

12. The apparatus according to claim 10, wherein said pulse shaper element is further configured for:
a) applying a first voltage pulse to a first terminal of said two-terminal device, said two-terminal device including a resistive memory element;
b) applying a second voltage pulse to a second terminal of said two-terminal device,
wherein said two voltage pulses have amplitudes and temporal profiles that are selected such that, depending on the relative arrival times of said first and second voltage spikes, a FIRST one of the following three effective voltages V1, V2, V3 is formed across said two-terminal device:
i) V1, which acts to read the resistance of said two-terminal device without changing the state of said two-terminal device, V1 being obtained in the event there is substantially no temporal overlap between said first and second voltage pulses;
ii) V2, which places said device in a lower-resistance state, V2 being obtained in the event said first voltage pulse begins before said second voltage pulse, and there is substantial temporal overlap between said first and second voltage pulses; and
iii) V3, which places said device in a higher-resistance state, V3 being obtained in the event said second voltage pulse begins before said first voltage pulse, and there is substantial temporal overlap between said first and second voltage pulses;
c) repeating a) to obtain a SECOND one of V1, V2, V3; and
d) repeating a) to obtain a THIRD one of V1, V2, V3.

13. The apparatus according to claim 10, wherein in response to a post-synaptic spike, said element generates a pulse at said post-synaptic terminal that starts at a baseline value and reaches a first voltage value a first period of time after said post-synaptic spike, followed by a second voltage value a second period of time after said post synaptic spike, followed by a return to said baseline voltage a third period of time after said post-synaptic spike.

14. An apparatus comprising:
a plurality of two-terminal devices each connected to a pre-synaptic terminal;
a plurality of rectifying elements having respective first and second ends, each connected at the first end to one of said two-terminal devices and connected at the second end to a post-synaptic terminal; and at least one pulse shaper element generating a series of voltage pulses to said pre-synaptic and post-synaptic terminals;

wherein in response to a received pre-synaptic spike, said pulse shaper element generates a pulse at said pre-synaptic terminal that occurs a predetermined period of time after said received pre-synaptic spike;

wherein each two-terminal device is connected to a rectifying element-comprising a turn-on voltage based on a threshold;

wherein each two-terminal device comprises a phase change memory (PCM) that has a set voltage, a reset voltage and a threshold voltage; and wherein said pulse has a magnitude greater than said turn-on voltage but less than the sum of said turn-on voltage and said threshold voltage.

15. The apparatus according to claim 14, wherein said plurality of said devices are embedded within an artificial spiking neural network, and wherein said pulse shaper element repeatedly generates said series of voltage pulses to said pre-synaptic and post-synaptic terminals, thereby forming spatio-temporal associations between said neural network and environmental events.

16. The apparatus according to claim 14, wherein in response to a post-synaptic spike, said element generates a pulse at said post-synaptic terminal that starts at a baseline value and reaches a first voltage value a first period of time after said post-synaptic spike, followed by a second voltage value a second period of time after said post synaptic spike, followed by a return to said baseline voltage a third period of time after said post-synaptic spike.

17. A computer program product for providing pre-synaptic and post-synaptic pulses to a synaptic device, said computer program product comprising:

a computer usable non-transitory medium having computer usable program code embodied therewith, said computer usable program code comprising:

computer usable program code configured to:

in response to a representation of a pre-synaptic spike, generate an instruction to a two-terminal device connected to a rectifying element to generate a pre-synaptic pulse that occurs a predetermined period of time after said received pre-synaptic spike, said rectifying element comprising a turn-on voltage based on a threshold; and in response to a representation of a post-synaptic spike, generate an instruction to a device to generate a post-synaptic pulse that starts at a baseline value and reaches a first voltage value a first period of time after said post-synaptic spike, followed by a second voltage value a second period of time after said post synaptic spike, followed by a return to said baseline voltage a third period of time after said post-synaptic spike;

wherein said two-terminal device comprises a phase change memory (PCM) that has a set voltage, a reset voltage and a threshold voltage; and wherein said pre-synaptic pulse has a magnitude greater than said turn-on voltage but less than the sum of said turn-on voltage and said threshold voltage.

18. The computer program product according to claim 17, wherein said computer usable program code is further configured to:

a) generate an instruction to a pulse shaper to apply a first voltage pulse to a first terminal of said two-terminal device, said device including a resistive memory element;

b) generate an instruction to said pulse shaper to apply a second voltage pulse to a second terminal of said two-terminal device, wherein said two voltage pulses have amplitudes and temporal profiles that are selected such that, depending on the relative arrival times of said first and second voltage spikes, a FIRST one of the following three effective voltages V1, V2, V3 is formed across said device:

i) V1, which acts to read the resistance of said device without changing the state of said device, V1 being obtained in the event there is substantially no temporal overlap between said first and second voltage pulses;

ii) V2, which places said device in a lower-resistance state, V2 being obtained in the event said first voltage pulse begins before said second voltage pulse, and there is substantial temporal overlap between said first and second voltage pulses; and iii) V3, which places said device in a higher-resistance state, V3 being obtained in the event said second voltage pulse begins before said first voltage pulse, and there is substantial temporal overlap between said first and second voltage pulses;

c) repeating a) to obtain a SECOND one of V1, V2, V3; and d) repeating a) to obtain a THIRD one of V1, V2, V3.

* * * * *